United States Patent
Bellegarda et al.

(10) Patent No.: US 7,849,141 B1
(45) Date of Patent: Dec. 7, 2010

(54) TRAINING A COMPUTER STORAGE SYSTEM FOR AUTOMATIC FILING OF DATA USING GRAPHICAL REPRESENTATIONS OF STORAGE LOCATIONS

(75) Inventors: Jerome R. Bellegarda, Los Gatos, CA (US); Scott Forstall, Mountain View, CA (US); Kim E. A. Silverman, Mountain View, CA (US); Kevin Tiene, Cupertino, CA (US); Bertrand Serlet, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1218 days.

(21) Appl. No.: 10/836,472

(22) Filed: Apr. 30, 2004

Related U.S. Application Data

(63) Continuation-in-part of application No. 10/430,694, filed on May 5, 2003, now Pat. No. 7,640,305, which is a continuation-in-part of application No. 10/213,922, filed on Aug. 6, 2002, now abandoned, which is a continuation-in-part of application No. 09/881,986, filed on Jun. 14, 2001, now Pat. No. 7,076,527.

(51) Int. Cl.
*G06F 15/16* (2006.01)

(52) U.S. Cl. .................. 709/206; 709/204; 709/224; 709/225; 707/665; 707/666; 707/667; 707/668; 715/744; 715/745; 715/746; 715/747; 715/752; 715/762; 715/763

(58) Field of Classification Search .............. 709/224, 709/225
See application file for complete search history.

(56) References Cited

U.S. PATENT DOCUMENTS

| 5,375,244 | A |   | 12/1994 | McNair |
|---|---|---|---|---|
| 5,377,354 | A | * | 12/1994 | Scannell et al. ............. 718/103 |
| 5,613,108 | A | * | 3/1997 | Morikawa ........................... 1/1 |
| 5,751,287 | A | * | 5/1998 | Hahn et al. .................. 715/775 |
| 5,877,963 | A | * | 3/1999 | Leung et al. ................ 700/223 |
| 5,884,033 | A |   | 3/1999 | Duvall et al. |
| 5,999,932 | A |   | 12/1999 | Paul |
| 6,023,723 | A | * | 2/2000 | McCormick et al. ......... 709/206 |

(Continued)

FOREIGN PATENT DOCUMENTS

EP        747846 A2 * 12/1996

OTHER PUBLICATIONS

Losee, R., et al., "Minimizing Information Overload: The Ranking of Electronic Messages," Journal of Information Science, 1989, pp. 179-189, vol.15.

(Continued)

*Primary Examiner*—John Follansbee
*Assistant Examiner*—Backhean Tiv
(74) *Attorney, Agent, or Firm*—Fenwick & West LLP

(57) ABSTRACT

A method, apparatus, and signal-bearing medium that files data in a destination based on one or more criteria. In various embodiments, the data may be email, email attachments, faxes, telephone messages, downloaded data or programs, audio, video, scanned images, photographs, blocks of text, or other data. In an embodiment, a training mode and an automatic mode are provided. During the training mode, a user is presented with data and a recommended destination, and the user provides feedback that is used to train the criteria. During an automatic mode, the data may be transferred to the destination with or without user confirmation.

117 Claims, 7 Drawing Sheets

U.S. PATENT DOCUMENTS

| | | | |
|---|---|---|---|
| 6,101,515 A | 8/2000 | Wical et al. | |
| 6,161,130 A * | 12/2000 | Horvitz et al. | 709/206 |
| 6,243,724 B1 * | 6/2001 | Mander et al. | 715/273 |
| 6,249,805 B1 * | 6/2001 | Fleming, III | 709/206 |
| 6,421,709 B1 * | 7/2002 | McCormick et al. | 709/206 |
| 6,474,008 B1 * | 11/2002 | Hofman et al. | 40/359 |
| 6,556,983 B1 * | 4/2003 | Altschuler et al. | 706/55 |
| 6,578,025 B1 | 6/2003 | Pollack et al. | |
| 6,592,627 B1 * | 7/2003 | Agrawal et al. | 715/234 |
| 6,654,787 B1 | 11/2003 | Aronson et al. | |
| 6,732,149 B1 | 5/2004 | Kephart | |
| 6,807,566 B1 | 10/2004 | Bates et al. | |
| 6,816,885 B1 | 11/2004 | Raghunandan | |
| 6,901,398 B1 * | 5/2005 | Horvitz et al. | 709/207 |
| 6,941,466 B2 * | 9/2005 | Mastrianni | 726/22 |
| 7,058,684 B1 | 6/2006 | Ueda | |
| 7,149,778 B1 | 12/2006 | Patel et al. | |
| 7,158,986 B1 * | 1/2007 | Oliver et al. | 707/102 |
| 7,219,148 B2 * | 5/2007 | Rounthwaite et al. | 709/224 |
| 7,219,302 B1 * | 5/2007 | O'Shaughnessy et al. | 715/752 |
| 7,249,162 B2 | 7/2007 | Rounthwaite et al. | |
| 7,284,033 B2 * | 10/2007 | Jhanji | 709/206 |
| 7,299,261 B1 | 11/2007 | Oliver et al. | |
| 7,634,736 B2 * | 12/2009 | Meek | 715/752 |
| 7,640,305 B1 * | 12/2009 | Arthur et al. | 709/206 |
| 2002/0016735 A1 * | 2/2002 | Runge et al. | 705/14 |
| 2002/0107925 A1 * | 8/2002 | Goldschneider et al. | 709/206 |
| 2002/0188689 A1 * | 12/2002 | Michael | 709/206 |
| 2003/0046421 A1 * | 3/2003 | Horvitz et al. | 709/238 |
| 2003/0187937 A1 | 10/2003 | Yao et al. | |
| 2004/0025037 A1 * | 2/2004 | Hair | 713/189 |
| 2004/0133434 A1 * | 7/2004 | Szlam et al. | 705/1 |
| 2005/0015451 A1 * | 1/2005 | Sheldon et al. | 709/206 |
| 2006/0026236 A1 * | 2/2006 | Scian et al. | 709/206 |
| 2007/0208856 A1 * | 9/2007 | Rounthwaite et al. | 709/225 |

OTHER PUBLICATIONS

Allan, J., Incremental Relevance Feedback for Information Filtering, *Proc. of SIGIR*, Aug. 1996, pp. 1-9.

Androutsopoulos, I. et al., Learning to Filter Spam E-Mail A Comparison of a Naïve Bayesian and a Memory-Based Approach, *In Workshop on Machine Learning and Textual Information Access*, 4th *European Conference on Principles and Practice of Knowledge Discovery in Databases*(PKDD 2000), 2000, p. 1-13.

Boone, G., Concept Features in Re: Agent, an Intelligent Email Agent, Proc. of the *Second International Conference on Autonomous Agents*, May 1988, pp. 141-148.

Cohen, W. W., Learning Rules that Classify E-Mail, Proc. Of the AAAI Spring Symposium on Machine Learning in Information Access, 1996, pp. 18-25.

Cohen, W. W. et al., Transferring and Retraining Learned Information Filters, *American Association for Artificia Intelligence*, 1997, 8 pages.

Crawford, E. et al., Automatic Induction of Rules for E-Mail Classification, Proc. of the Sixth Australasian Document Computer Symposium, Dec. 2001, 8 pages.

Crestani, F. et al., "Is This Document Relevant? ... Probably," A Survey of Probabilistic Models in Information Retrieval, *ACM Computing Surveys*, vol. 30, No. 4, Dec. 1998, pp. 528-552.

Cunningham, P. et al., A Case-Based Approach to Spam Filtering that Can Track Concept Drift, in the Iccbr'03 Workshop on Long-Lived CBR Systems, Trondheim, Norway, Jun. 2003, 9 pages.

Gee, K. R., Using Latent Semantic Indexing to Filter Spam, *Proceedings of the* 2003 *ACM Symposium on Applied Computing*, Feb. 2003, pp. 460-464.

Graham, P., Better Bayesian Filtering, *Spam Conference*, Jan. 2003, [retrieved from the internet] (Dec. 2, 2003), <URL: http://www.paulgraham.com/better.html> pp. 1-11.

Harman, D., Overview of the Fourth Text Retrieval Conference, in D. K. Harman, editor, Proceedings of the Fourth Text Retrieval Conference (TREC-9). NIST Special Publication 500- 236, Oct. 1996.

Helfman, J. I. et al., Ishmail: Immediate Identification of Important Information, Technical Report, AT&T Labs, 1995, (Submitted to CHI-96) 8 pages.

Madigan, D., Statistics and The War on Spam, (publication date unknown) [retrieved from the internet], Apr. 19, 2004, URL:<http://www.stat.rutgers.edu/—madigan/PAPERS/sagtu.pdf>, pp. 1-3.

Pantel, P. et al., SpamCop: A Spam Classification & Organization Program, *in Proc. Of AAAI-98 Workshop on Learning for Text Categorization*, Mar. 11, 1998, pp. 1-8.

Provost, J., Naive-Bayes vs. Rule-Learning in Classification of Email, Technical Report AI-TR-99-284, Univ. Of Texas at Austin, 4 pages.

Rennie, J. D. M., ifile: An Application of Machine Learning to E-Mail Filtering*, *in KDD-2000 Text Mining Workshop*, Boston, 2000, 6 pages.

Robertson, S.E. et al., Microsoft Cambridge at TREC-9: Filtering Track, Ninth Text Retrieval Conference (TREC-9 ) held in Gaithersburg, Maryland, Nov. 13-16, 2000, 8 pages.

Robinson, G. Issue 107: A Statistical Approach to the Spam Problem, *LINUX Journal*, Mar. 1, 2003 [retrieved from the internet Dec. 3, 2003] <URL:http://www.linuxjournal.com/article.php?sid=6467> pp. 1-10.

Sahami, M. et al., A Bayesian Approach to Filtering Junk E-Mail, *Learning for Text Categorization — Papers from the AAAI Workshop*, AAAI Technical Report, 1998, pp. 55-62.

Shah, C. and Bhattacharyya, P., Improving Document Vectors Representation Using Semantic Links and Attributes, *ICON-2003: International Conference on Natural Language Processing*, 2003, pp. 1-10.

Soboroff, I. M. et al., Combining Content and Collaboration in Text Filtering, *Proceedings of the IJCAI'99 Workshop on Machine Learning in Information Filtering*, Aug. 1999, pp. 86-91.

Terveen, L.G. et al., "Helping Users Program Their Personal Agents," in Proceedings of the 1996 Conf. On Human Factors in Computing System (CHI '96), pp. 355-361, Vancouver, Apr. 1996, pp. 355-361.

* cited by examiner

TRAINING A COMPUTER STORAGE SYSTEM FOR AUTOMATIC FILING OF DATA USING GRAPHICAL REPRESENTATIONS OF STORAGE LOCATIONS

RELATED APPLICATIONS

This application is a continuation-in-part of and claims priority to application Ser. No. 09/881,986, filed Jun. 14, 2001, now U.S. Pat. No. 7,076,527 which is hereby incorporated by reference. This application also claims priority as a continuation-in-part to application Ser. No. 10/213,922, filed Aug. 6, 2002, now abandoned which is hereby incorporated by reference. In addition, this application claims priority as a continuation-in-part to application Ser. No. 10/430,694, filed May 5, 2003 now U.S. Pat. No. 7,640,305, which is hereby incorporated by reference.

FIELD OF THE INVENTION

The present invention relates generally to the automatic filing of data. More particularly, this invention relates to automatically filing data based on one or more criteria.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2004, Apple Computer, Inc., All Rights Reserved.

BACKGROUND

As the use of computers and the Internet have proliferated, so too has the use of electronic mail (email). Many businesses, advertisers, organizations, and individuals use email as a prominent or even a primary means of communication. Since email is so easy and inexpensive to send compared to other means of communications such as letters, faxes, and telephone calls, the result is a deluge of email, both solicited and unsolicited, received by email users. One method to deal with all this email is for the user to manually select and file the email in destinations, such as boxes, files, databases, folders, subfolders, directories, subdirectories, or other containers.

Although the problem of received email is particularly acute, users also have a need to sort and file all types of data, whether this data is email attachments, faxes, telephone calls, downloaded programs and data, audio, video, scanned images, photographs, instant messages, files, databases, records, blocks of text or any other type of data.

Because users receive so much data, they often experience difficulty in determining the appropriate destination and in remembering which destinations are available. For example, it is common for users to have multiple folders that store very similar data (e.g. folders named "photos," "myphotos," and "pictures"). When a new piece of data is received, the users cannot remember that they already have an appropriate folder in which to store the data, so they create a new, superfluous folder.

What is needed is a technique to help users file their data in an appropriate destination.

SUMMARY

A method, apparatus, and signal-bearing medium are provided that files data in a destination or assigns metadata indicating a destination for the data based on a criteria. In various embodiments, the data may be email, email attachments, faxes, telephone messages, downloaded data or programs, audio, video, scanned images, photographs, instant messages, files, databases, records, blocks of text, or other data. In an embodiment, a training mode and an automatic mode are provided. During the training mode, a user is presented with data and a recommended destination, and the user provides feedback that is used to train the one or more criteria. During an automatic mode, data is transferred to the destination.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Parts of the description may be presented in terms of operations performed through the execution of programming instructions. As well understood by those skilled in the art, these operations may take the form of electrical, magnetic, or optical signals capable of being stored, transferred, combined, and otherwise manipulated through, for example, electrical components.

Figure 1A:
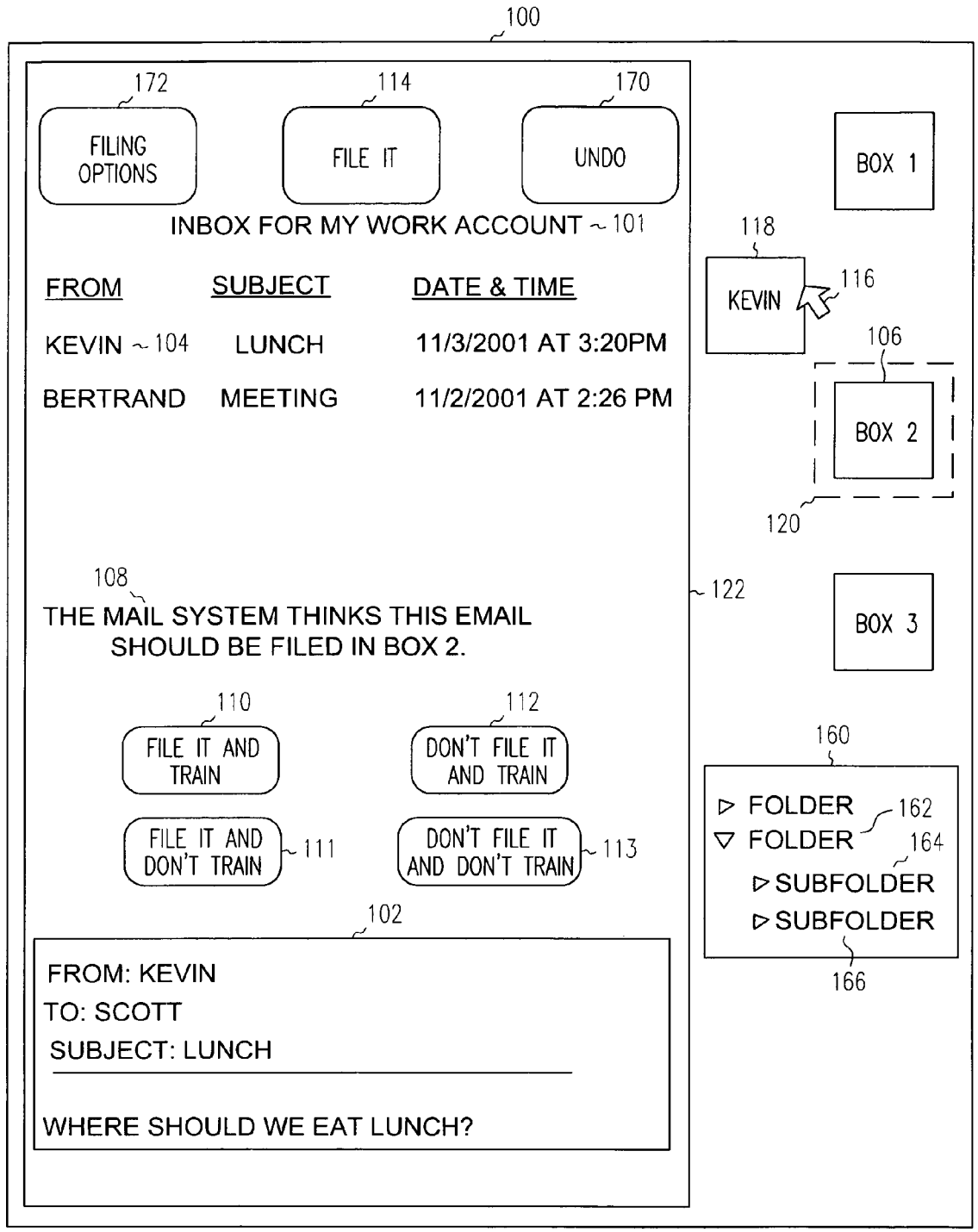
FIG. 1A depicts a pictorial representation of an example user interface for a mail system, according to an embodiment of the invention.

FIG. 1A depicts a pictorial representation of an example user interface 100 for processing received data in the form of electronic mail (email), according to an embodiment of the invention. Although an embodiment of the invention will be described in the context of an email or other messaging system, another embodiment operates in the context of a file system, still another embodiment operates in the context of an address book, and yet another embodiment operates in the context of a web browser and still other embodiments operate in the context of an image management system. Other embodiments of the invention operate in the context of the processing of filing email attachments, faxes, telephone calls, downloaded programs and data, audio, video, scanned images, photographs, instant messages, files, databases, records, blocks of text or any other environment in which it is advantageous to file data based on one or more criteria.

As shown in the user interface 100 for an inbox 101, during a training mode, the mail system has analyzed the contents 102 of email 104 and determined that a recommended destination for the email 104 is box2 106. The mail system determines the recommended destination based on one or more criteria, such as filters as further described below with reference to FIG. 2. In response to a user selecting the email 104, the mail system displayed the contents 102 of the email 104 and displayed the recommendation of the destination via a message 108: "The mail system thinks this email should be filed in box 2." The user may select the email 104 by passing a cursor over the email 104 or over an identifier of the email 104, by clicking on the email 104 via a mouse or other pointing device, by a voice command, or by any other appropriate selection mechanism. The user may provide training data or feedback to the mail system via the buttons "file it and train" 110, "file it and don't train" 111, "don't file it and train" 112, and "don't file it and don't train" 113, in response to the message 108.

By selecting the "file it and train" button 110, the user gives positive feedback by confirming that the mail system's recommended destination is correct and requests that the mail system transfer, move, or file the email 104 in box2 106. The mail system uses this positive confirmation of its recommended destination to train one or more criteria, such as a filter that is used to make future destination recommendations. By selecting the "file it and don't train" button 111, the user requests that the mail system transfer, move, or file the email 104 in box2 106, but the criteria are not to be trained. By selecting the "don't file it and train" button 112, the user gives negative feedback and rejects the mail system's recommendation, which trains the filter that the recommendation was not correct. By selecting the "don't file it and don't train" button 113, the user rejects the mail system's recommendation, and the email is not transferred, but the filter is not trained.

Although the confirmation is shown in FIG. 1 as being accomplished via buttons 110, 111, 112, and 113, in other embodiments any appropriate confirmation may be used. Although the message 108 is shown as recommending only box2 106, in another embodiment, the message 108 may recommend multiple boxes and allow the user to choose between them. In other embodiments, the message 108 may recommend multiple destination boxes (such as box2 and box3) and then refile the same message in each one of the multiple destination boxes (box2 and box3). In some other embodiments, the system forgoes a positive confirmation from a user and instead asks a user where to file a received email, file, or other data item. The system is trained by the user filing the received item. Other embodiments are configurable to request confirmation and/or request a filing location.

The user may also request that any mail be transferred to a destination even in the absence of a recommendation via "file it" button 114. In an embodiment, the "file it" button 114 may also serve for the user to request that the mail system file the selected email in the destination in which an email was most recently filed.

Although the user interface 100 shown in FIG. 1A includes four buttons 110, 111, 112 and 113, embodiments of the invention have any number of feedback buttons. In some embodiments, the user interface 100 has a single button such as in the example user interface described later by reference to FIG. 1C. The single button is selected when the user wants to refile the message. In the single button example, whether or not training is to occur is defined, set or otherwise specified in preferences, options or other similar system or application settings.

In another embodiment, when the user drags or otherwise moves the email 104, for example via a pointer 116 and a pointing device, the mail system represents the mail 104 as an icon 118 and presents a recommendation of a destination in the form of indication 120. Although the indication 120 is shown in FIG. 1 as a dashed box, in other embodiments, the indication 120 may be a highlighted destination, a colored destination, an arrow pointing to the destination, a blinking destination, a glowing destination, an animation associated with the destination, a gravitational pull toward the destination, an icon, window, or message adjacent to, associated with, or identifying the destination, or any other appropriate indication of the recommended destination.

When the user releases, drops, or stops dragging the icon 118, the mail system automatically transfers, moves, or files the email 104 in the recommended destination 106. In another embodiment, the mail system only files the email 104 if the user has moved the icon 118 past a specified distance, point, or threshold. For example, in an embodiment, the mail system only automatically files the email in the recommended destination if the drag of the icon has departed the mail system window 122. In another embodiment, the mail system files the email 104 in the recommended destination 106 when the user issues a command, which in an embodiment may be a keyboard key or combination of keys, a pointing-device button, a voice command, or any other appropriate type of command.

Although FIG. 1A shows the recommended destination 106 to be a mail box, in other embodiments, the destination may be a file, database, folder, subfolder, directory, subdirectory, container, or any other appropriate destination to which data may be filed or transferred. When the destination is a child (e.g., a subfolder, subdirectory, or child box) and the child is hidden in a compressed view, the mail system may expand the compressed view to show the child when making the recommendation, so that the ultimate recommended destination is visible to the user. An expanded listview 160 shows a folder 162 having children subfolders 164 and 166. After the email is transferred, the mail system recompresses the list view.

In another embodiment the list view is not expanded, but instead the path name of the recommended child is presented. In another embodiment, a folder is sprung open to show subfolders. In yet another embodiment, only destinations visible to the user are recommended, and the user decides which child within the visible destination should be the final destination. In still another embodiment, one or more recommended destinations or metadata attributes are displayed in a pull down message located on or near the message.

In an embodiment, the mail system analyzes all available destinations in order to make a recommendation. In another embodiment, the mail system analyzes a subset of all available destinations where the subset is selected based on the recency (most recent use) of use of the destinations, the frequency of use of the destinations, a combination of recency and frequency, or another other appropriate technique for choosing a subset of the possible destinations. In still another embodiment, the subset of all available destinations or metadata attributes is manually configured by a user.

In one embodiment the system recommends a destination based on metadata about the file itself, or based on actual content in the file, or based on a combination of both. Metadata about the file includes any information about the file. Examples of metadata about the file include, but are not limited to date, time, sender, file type and so on. The actual content of the file can be used to recommend a destination using a variety of techniques for analyzing content of data items. One example technique is latent symantic analysis as described in application Ser. No. 09/881,986, filed Jun. 14, 2001. However, any other suitable techniques may be used to recommend a destination as well.

The mail system also provides an "undo" button 170 to allow the user to request that the mail system undo the most recent transfer of email to a destination and return the email to its original inbox 101.

FIG. 1A also includes "filing options" button 172, which allows the user to set filing options, as further described below with reference to FIG. 1B.

Figure 1B:
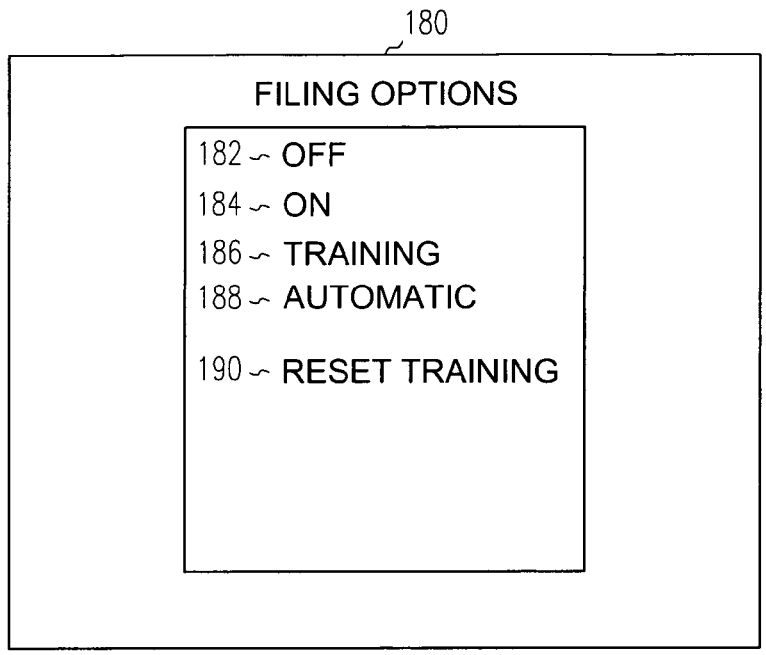
FIG. 1B depicts a pictorial representation of an example user interface for filing options, according to an embodiment of the invention.

FIG. 1B depicts a pictorial representation of an example user interface 180 for filing options, according to an embodiment of the invention. The mail system provides the menu item "off" 182 to allow the user to request that the data filing system be turned off The mail system provides the menu item "on" 184 to allow the user to request that the data filing system be turned on. In another embodiment, menu items 182 and 184 may be implemented via a single toggle switch or any other appropriate user interface element. The mail system provides the menu item "training" 186 to allow the user to request that the data filing system be set in training mode. While in training mode, the email system is trained to sort and file email based on the user's destinations. The training mode is further described below with reference to FIG. 3.

The mail system provides the menu item "automatic" 188 to allow the user to request that the data filing system be set in automatic mode. While in automatic mode, the mail system automatically categorizes mail to destinations and transfers the mail to those destinations. The automatic mode is further described below with reference to FIG. 2. In another embodiment, the data filing system may recommend switching from training to automatic mode based on a success rate of its filing recommendations.

The mail system provides the menu item "reset training" 190 to allow the user to request that the data filing system be reset to the factory settings. The "reset training" option 190 causes the data filing system to undo all of the previous training. In an embodiment, the training data may be deleted, but in another embodiment, the training data may be kept but ignored.

Embodiments of the invention are not limited to combination of filing options presented in FIG. 1B. Any combinations of filing options are within the scope of embodiments of the invention. For example, in an alternate embodiment there are three filing options or modes: "off" 182, "automatic" 188 and "training" 186 where the training mode waits for positive confirmation from a user before refiling an item.

Figure 1C:
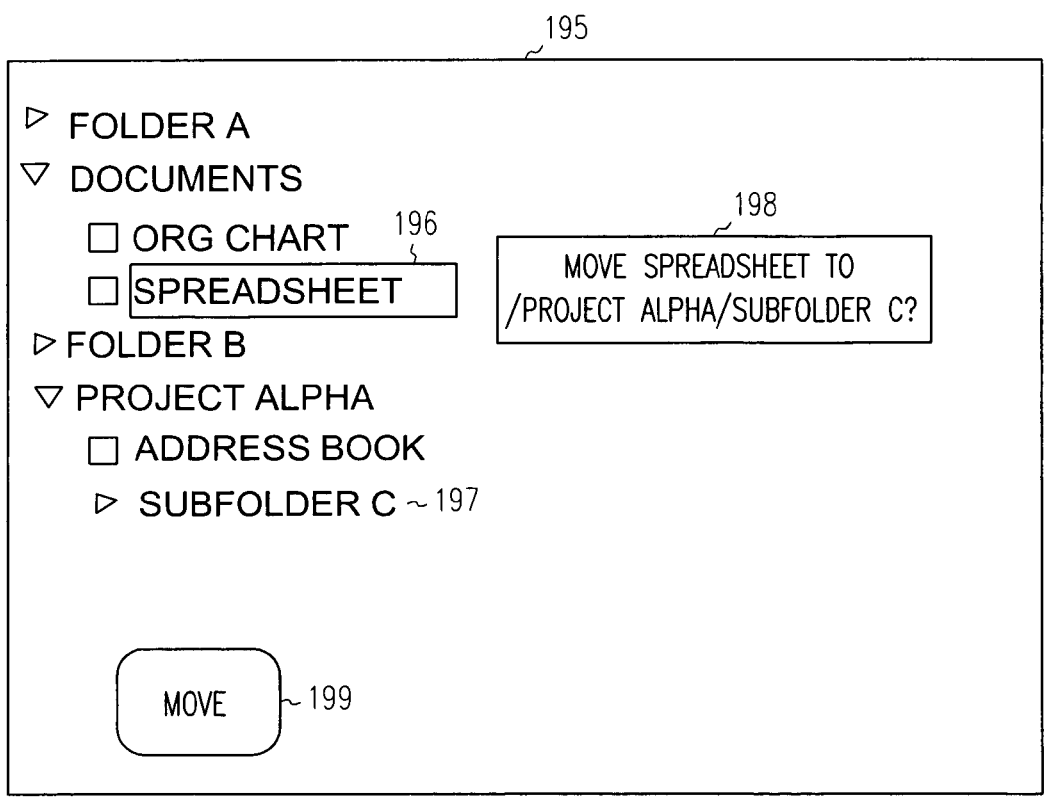
FIG. 1C depicts a pictorial representation of an example user interface for a file system, according to an embodiment of the invention.

FIG. 1C depicts a pictorial representation of an example user interface for a file system, according to an embodiment of the invention. A listview 195 in the file system shows a spreadsheet file 196, which the user has selected. In response to the selection, the file system has made a recommendation 198 to move the spreadsheet to a subfolder 197. The recommendation is based on one or more criteria, analogous to the criteria already described above with reference to FIG. 1A. The user may accept the recommendation via move button 199 (the confirmation or feedback in this example), which causes the file system to move the spreadsheet file 196 (the data in this example) to the recommended subfolder 197 (the destination in this example). The file system then trains its criteria based on the confirmation.

Some embodiments learn how and where to file items for each user of a system that is used by multiple users. In one such embodiment, a system is configured for two users and recommends storage locations based on the teachings of only that user. Some other embodiments use the teachings of all users on a system. Yet some further embodiments where the present invention is implemented for some or all the users of a network, the teachings of all users on the network are used. In another embodiment, only the teachings of a group of users on the network are used.

In still other embodiments, user interfaces for filing data such as the user interfaces shown in FIGS. 1A and 1C recommend metadata to be assigned to data. Rather than filing the data in appropriate destination for the data, the system associates metadata with the data.

Figure 2:
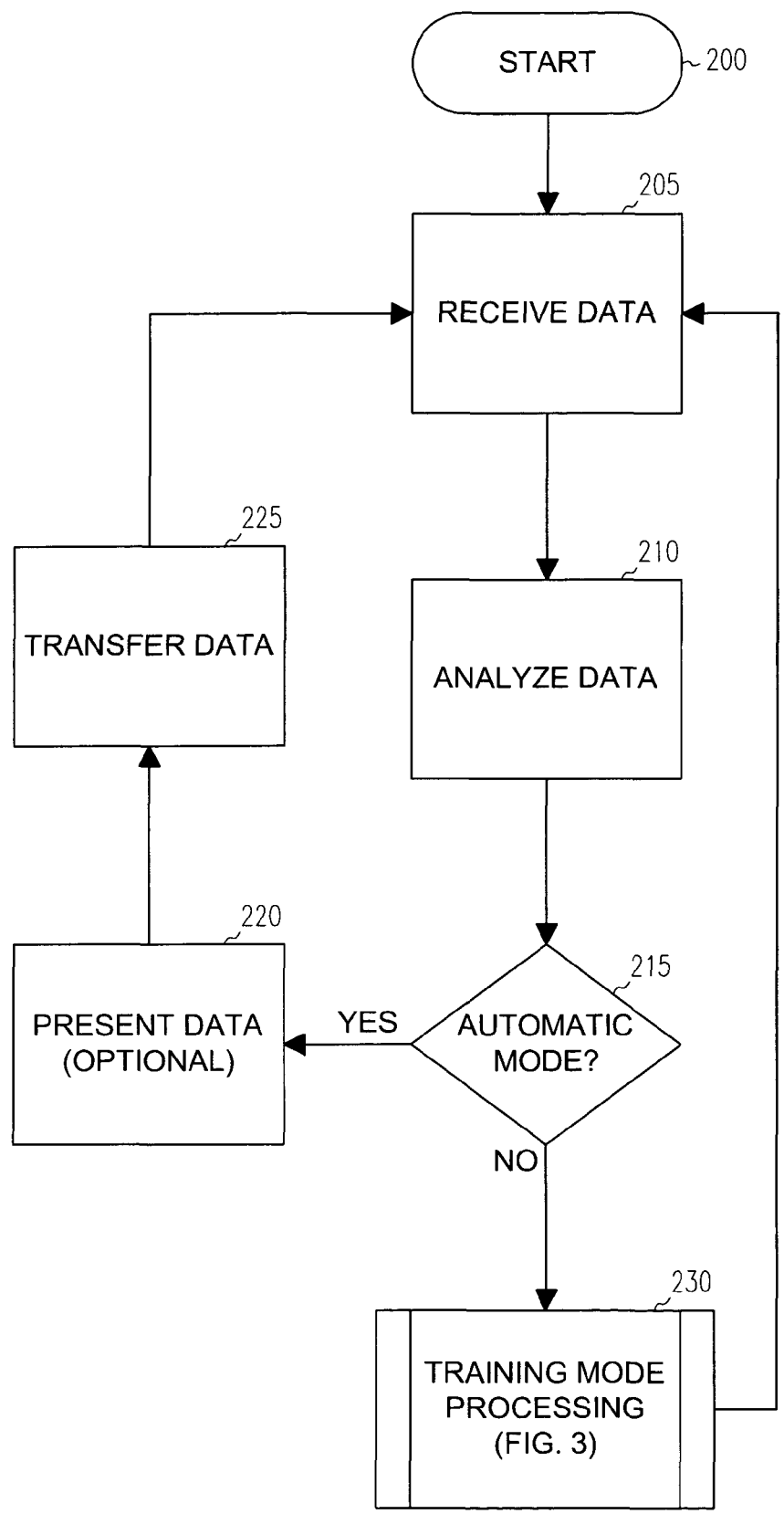
FIG. 2 depicts a flowchart of example processing for handling data in an automatic mode, according to an embodiment of the invention.

FIG. 2 depicts a flowchart of example processing for handling data in an automatic mode, according to an embodiment of the invention. Control begins at block 200. Control then continues to block 205 where data is received. Although in an embodiment the data may be electronic mail, in other embodiments, the data may be email attachments, faxes, telephone calls, downloaded programs and data, audio, video, scanned images, photographs, instant messages, files, databases, records, blocks of text, or any other type of data. In another embodiment, it is not necessary to receive the data because the data is already present, for example, in a file system, address book, or other appropriate location.

Control then continues to block 210 where the data is analyzed and a recommended destination for the data is determined. The data may be analyzed based on one or more criteria by comparing the data to existing destinations and determining the destination that is the closest to the data using latent semantic analysis, as described in application Ser. No. 09/881,986, filed Jun. 14, 2001. In other embodiments a vector space or any other appropriate technique for determining the destination of the data may be used.

Control then continues to block 215 where a determination is made whether the system is currently in automatic mode. If the determination at block 215 is true, control continues to block 220 where the data is presented either visually, aurally, or via any other appropriate mechanism. Control then continues to block 225 where the data is transferred, moved, or filed to the destination determined in block 210. In another embodiment, block 220 is optional and control continues directly from block 215 to block 225. In another embodiment, control continues from block 220 to block 225 only after the user has taken an action, such as indicating that the user is done reading, viewing, or listening to the data. In another embodiment, the data is not transferred to the destination until a period of time has elapsed. Control then returns from block 225 to block 205 as previously described above.

If the determination at block 215 is false, then control continues to block 230 where the data is processed in a training mode, as further described below with respect to FIG. 3.

Figure 3:
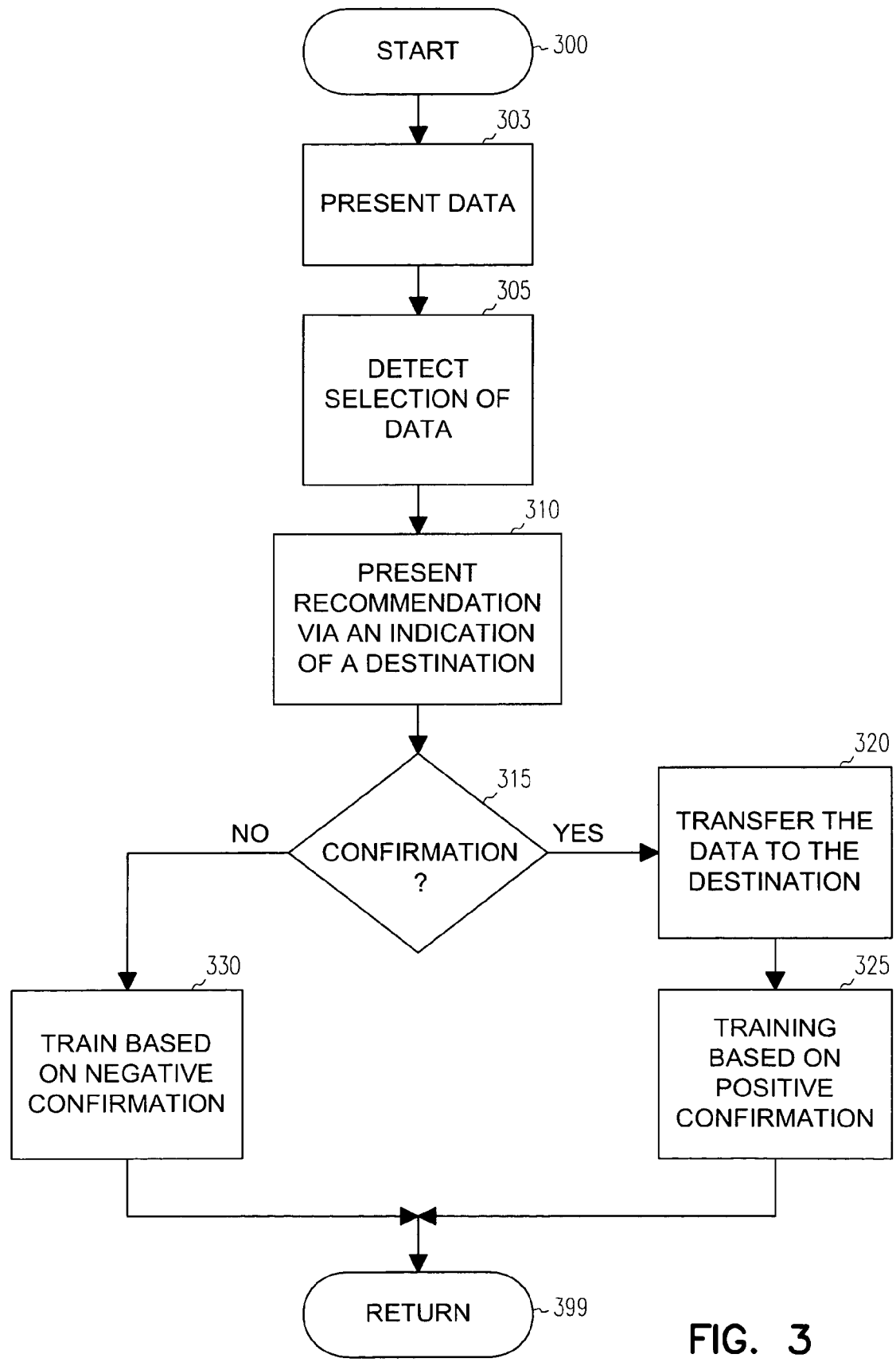
FIG. 3 depicts a flowchart of example processing for handling data in a training mode, according to an embodiment of the invention.

FIG. 3 depicts a flowchart of example processing for handling data in a training mode, according to an embodiment of the invention. Control begins at block 300. Control then continues to block 303 where the data is presented. Presentation of the data may include complete presentation of the data, partial presentation of the data, or only the name or other identifying information associated with the data may be presented. In an embodiment, the data may be presented in visual form, for example as described above with reference to FIG. 1A. In another embodiment, the data may be presented in visual form, for example as described above with reference to FIG. 1C. In another embodiment, the data may be presented in audio form. In still another embodiment any appropriate mechanism may be used for presenting the data.

Control then continues to block 305 where a selection of the data is detected as previously described above with reference to FIGS. 1A and/or 1C. Control then continues to block 310 where the recommendation previously determined at block 210 is presented via an indication of a destination as previously described above with reference to FIGS. 1A and/or 1C. Control then continues to block 315 where feedback is received as previously described above with reference to FIGS. 1A and/or 1C. If the feedback is a positive confirmation of the recommended destination, then control continues to block 320 where the data is transferred, filed, or moved to the recommended destination. Control then continues to block 325 where the criteria or filing filters are optionally trained based on the positive confirmation of the recommendation. The criteria or filing filters may be trained or customized as described in application Ser. No. 09/881,986, filed Jun. 14, 2001.

If the feedback is negative, so that the recommended destination is not confirmed at block 315, then control continues to block 330 where the criteria or filing filters are optionally trained based on the negative feedback. The criteria or filing filters may be trained or customized as described in application Ser. No. 09/881,986, filed Jun. 14, 2001. Control then continues to block 399 where the function returns.

Figure 4:
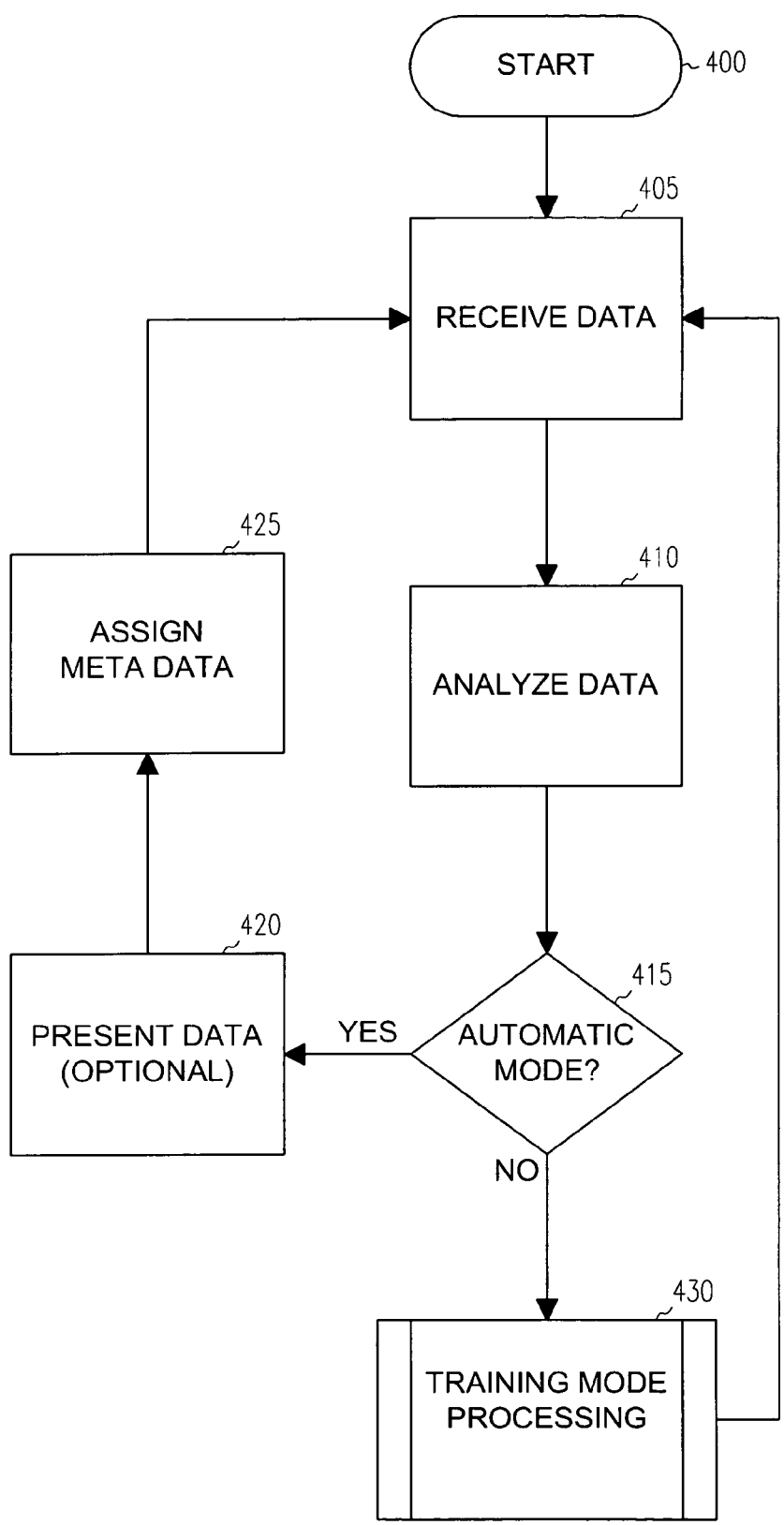
FIG. 4 depicts a flowchart of an alternate method for handling data in an automatic mode, according to an embodiment of the invention.

FIG. 4 depicts a flowchart of an alternate method for handling data in an automatic mode. In this embodiment, rather than transferring the data to the destination, metadata is associated with the data. The metadata is a tag or any other internal or external data structure used to provide information about the data. In one embodiment, the metadata is assigned based on previous associations with similar data. Control begins at block 400. Control then continues to block 405 where data is received. Control then continues to block 410 where the data is analyzed and recommended metadata for the data is determined. Control then continues to block 415 where a determination is made whether the system is currently in automatic mode. If the determination at block 415 is true, control continues to block 420 where the data is presented either visually, aurally, or via any other appropriate mechanism. Control then continues to block 425 where metadata is associated with the data. In one example, the metadata identifies a destination for the data. However, embodiments of the invention are not limited to uses of metadata for identifying destinations. Metadata can associate any type of information with data including, but not limited to information such as file types and projects. Control then returns from block 425 to block 405.

If the determination at block 415 is false, then control continues to block 430 where the data is processed in a training mode, as further described below with respect to FIG. 5.

Figure 5:
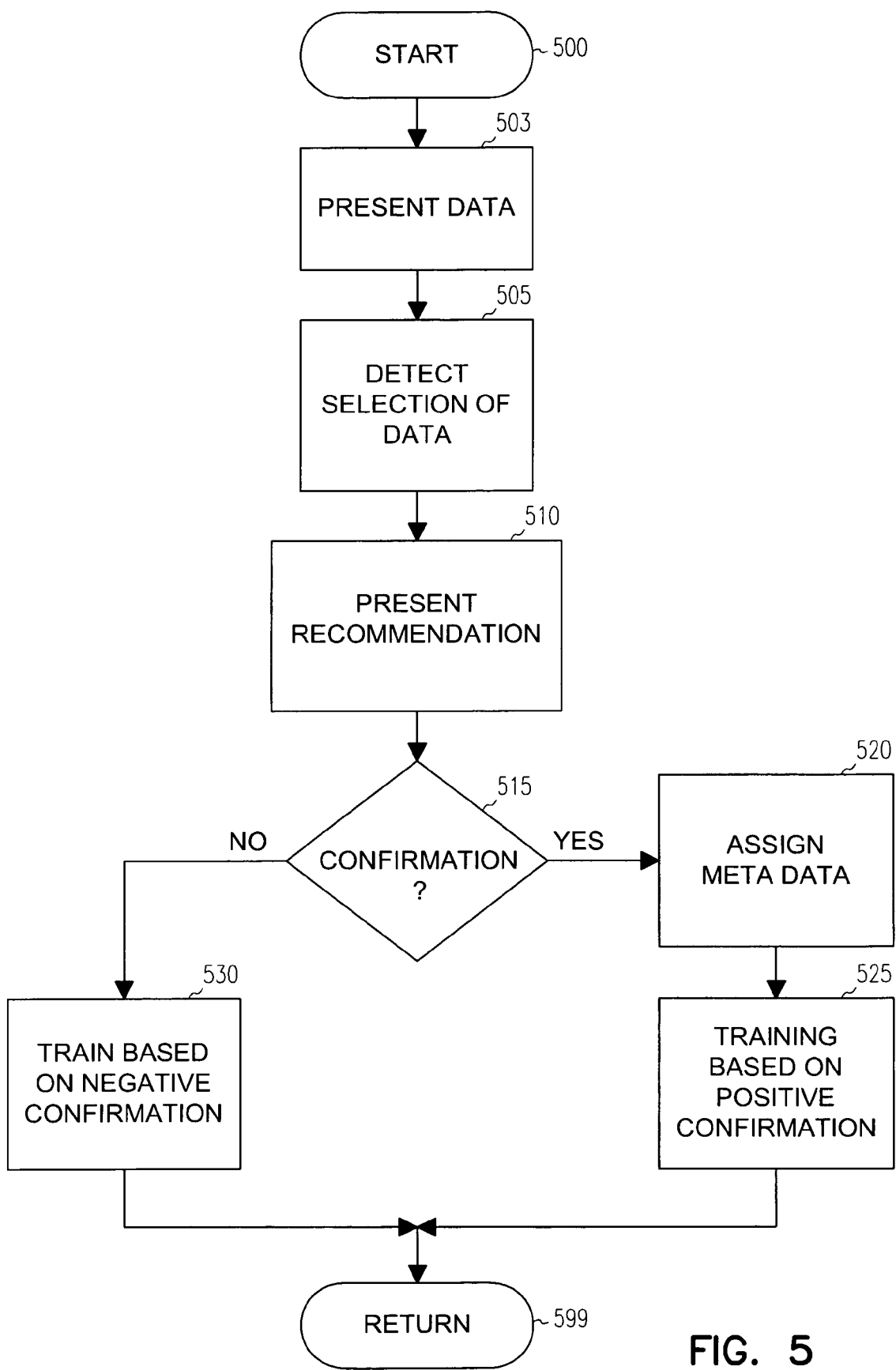
FIG. 5 depicts a flowchart of an alternate method for handling data in a training mode, according to an embodiment of the invention.

FIG. 5 depicts a flowchart of an alternate method for handling data in a training mode, according to an embodiment of the invention. Control begins at block 500. Control then continues to block 503 where the data is presented. Control then continues to block 510 where the recommendation previously determined at block 510 is presented as previously described above with reference to FIGS. 1A and/or 1C. Control then continues to block 515 where feedback is received as previously described above with reference to FIGS. 1A and/or 1C. If the feedback is a positive confirmation of the recommended metadata, then control continues to block 520 where metadata is assigned to the data. Control then continues to block 525 where the criteria or filing filters are optionally trained based on the positive confirmation of the recommendation. The criteria or filing filters may be trained or customized as described in application Ser. No. 09/881,986, filed Jun. 14, 2001. Control then continues to block 599 where the function returns.

If the feedback is negative, so that the recommended metadata is not confirmed at block 515, then control continues to block 530 where the criteria or filing filters are optionally trained based on the negative feedback. The criteria or filing filters may be trained or customized as described in application Ser. No. 09/881,986, filed Jun. 14, 2001. Control then continues to block 599 where the function returns.

One method training that is described in application Ser. No. 09/881,986, filed Jun. 14, 2001 is latent semantic analysis (LSA). Latent semantic analysis is a method that automatically uncovers the salient semantic relationships between words and documents in a given corpus. Discrete words are mapped onto a continuous semantic vector space, in which clustering techniques may be applied. Although this example is described by reference to email messages, latent semantic analysis can be applied to train filters for any types of data. This method for filtering data comprises determining a first semantic anchor corresponding with a first group of email messages, for example, legitimate email messages and a second semantic anchor corresponding with a second group of email messages, for example, unsolicited email messages. Determining a vector corresponding with an incoming email message, comparing the vector with at least one of the first semantic anchor and the second semantic anchor to obtain at least one comparison value, and filtering messages based on the comparison value.

Figure 6:
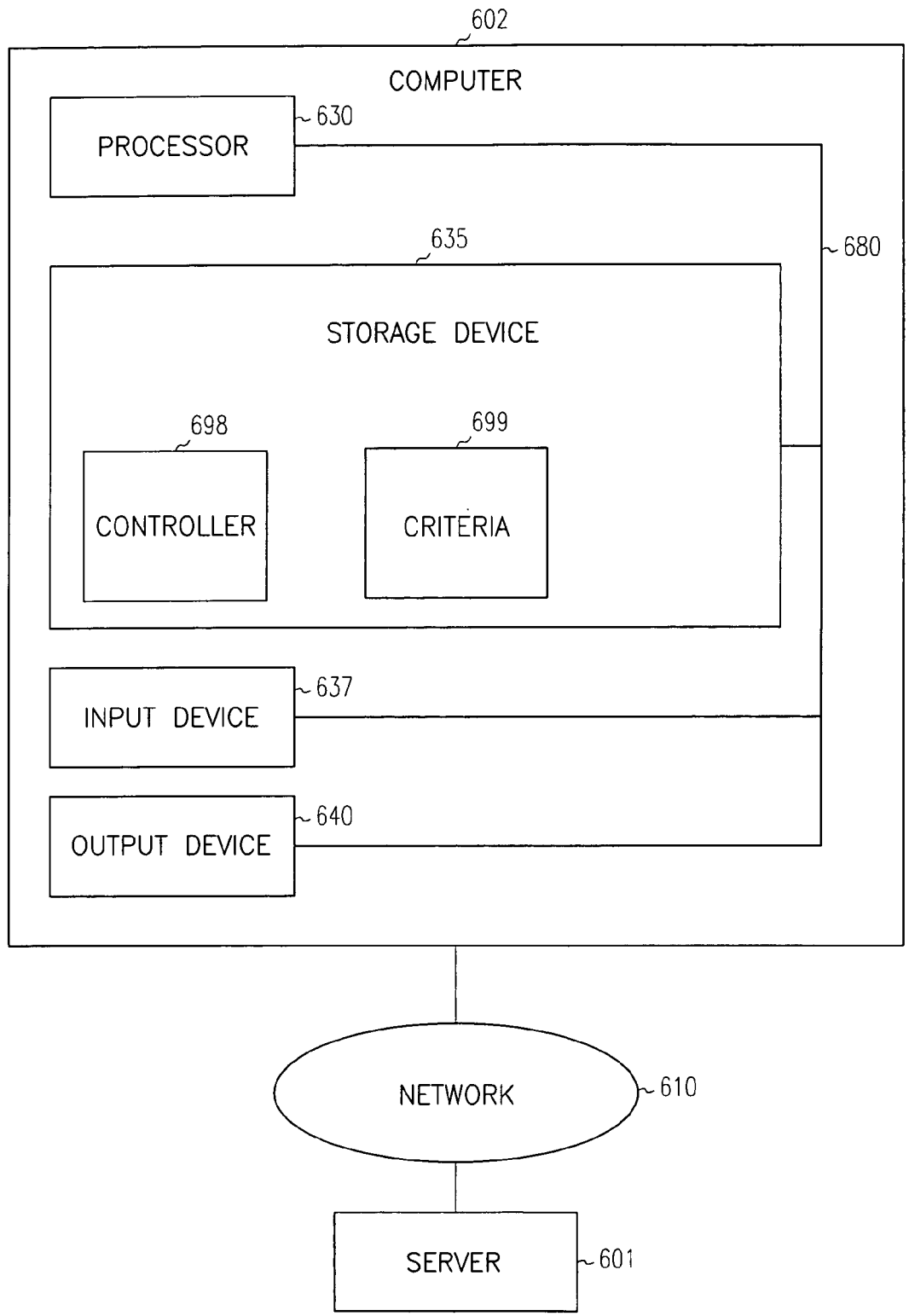
FIG. 6 depicts a block diagram of a system for implementing an embodiment of the invention.

FIG. 6 depicts a block diagram of a system for implementing an embodiment of the invention. Embodiments of a data filing system may be employed individually on a machine for a particular user or on a central machine, e.g., a server, to file data messages for a group of users. Alternative embodiments may include employing the data filing system on a server or other device that communicates with a remote user, for example, a user using a wireless device such as a wireless personal digital assistant (PDA) or wireless palm top computer. Alternative embodiments may employ the data filing system on the PDA.

An embodiment of the invention may utilize a distributed computing environment, in which program modules may be physically located in different local and remote memory storage devices. Execution of the program modules may occur locally in a stand-alone manner or remotely in a client/server manner. Examples of such distributed computing environments include local area networks, enterprise-wide networks, and the Internet.

Illustrated are a server 601 connected to a computer 602 via a network 610. Although one server 601, one computer 602, and one network 610 are shown, in other embodiments any number or combination of them may be present. Although the server 601 and the network 610 are shown, in another embodiment they may not be present.

The computer 602 may include a processor 630, a storage device 635, an input device 637, and an output device 640, all connected via a bus 680.

The processor 630 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 630 may execute instructions and may include that portion of the computer 602 that controls the operation of the entire computer. Although not depicted in FIG. 6, the processor 630 typically includes a control unit that organizes data and program storage in memory and transfers data and other information between the various parts of the computer 602. The processor 630 may receive data from the input device 637, may read and store code and data in the storage device 635, may send data to the output device 640, and may send and receive code and/or data to/from the network 610.

Although the computer 602 is shown to contain only a single processor 630 and a single bus 680, the present invention applies equally to computers that may have multiple processors and to computers that may have multiple buses with some or all performing different functions in different ways.

The storage device 635 represents one or more mechanisms for storing data. For example, the storage device 635 may include read only memory (ROM), random access memory (RAM), magnetic disk storage media, optical storage media, flash memory devices, and/or other machine-readable media. In other embodiments, any appropriate type of storage device may be used. Although only one storage device 635 is shown, multiple storage devices and multiple types of storage devices may be present. Further, although the computer 602 is drawn to contain the storage device 635, it may be distributed across other computers, for example on server 601.

The storage device 635 includes a controller 698, which in an embodiment may include instructions capable of being executed on the processor 630 to carry out the functions of the present invention, as previously described above with reference to FIGS. 1A, 1B, 1C, 2, and 3. In another embodiment, some or all of the functions of the present invention may be carried out via hardware in lieu of a processor-based system. The controller 698 implements a data filing system, which in various embodiments may be, for example, mail system, a file system, a browser, an optical character recognition system capable of receiving faxes or scanned images, an image processor, or a downloader that downloads code and/or data from the network 610. Although the controller 698 is shown to be contained within the storage device 635 in the computer 602, some or all of the controller 698 may be distributed across other systems, for example on the server 601 and accessed via the network 610.

The storage device 635 also contains one or more criteria 699, such as filing filters, which in an embodiment may be a database of destinations and associated data that uses latent semantic content analysis to correlate the data to the database, as described in application Ser. No. 09/881,986, filed Jun. 14, 2001. The filing filter may be customized or trained as described in application Ser. No. 09/881,986, filed Jun. 14, 2001. In other embodiments, a vector space or any other appropriate technique may be used. Of course, the storage device 635 may also contain additional software and/or data (not shown).

The input device 637 may be a keyboard, pointing device, mouse, trackball, touchpad, touchscreen, keypad, microphone, voice recognition device, or any other appropriate mechanism for the user to input data to the computer 602. Although only one input device 637 is shown, in another embodiment any number and type of input devices may be present.

The output device 640 is that part of the computer 602 that communicates output to the user. The output device 640 may be a cathode-ray tube (CRT) based video display well known in the art of computer hardware. But, in other embodiments the output device 640 may be replaced with a liquid crystal display (LCD) based or gas, plasma-based, flat-panel display. In another embodiment, the output device 640 may be a speaker. In still other embodiments, any appropriate output device suitable for presenting data may be used. Although only one output device 640 is shown, in other embodiments, any number of output devices of different types or of the same type may be present.

The bus 680 may represent one or more busses, e.g., PCI, ISA (Industry Standard Architecture), X-Bus, EISA (Extended Industry Standard Architecture), or any other appropriate bus and/or bridge (also called a bus controller).

The computer 602 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, appliances with a computing unit, pocket computers, and mainframe computers are examples of other possible configurations of the computer 602. The hardware and software depicted in FIG. 4 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 610 may be any suitable network and may support any appropriate protocol suitable for communication between the server 601 and the computer 602. In an embodiment, the network 610 may support wireless communications. In another embodiment, the network 610 may support hard-wired communications, such as a telephone line or cable. In another embodiment, the network 610 may support the Ethernet IEEE (Institute of Electrical and Electronics Engineers) 802.3x specification. In another embodiment, the network 610 may be the Internet and may support IP (Internet Protocol). In another embodiment, the network 610 may be a local area network (LAN) or a wide area network (WAN). In another embodiment, the network 610 may be a hotspot service provider network. In another embodiment, the network 610 may be an intranet. In another embodiment, the network 610 may be a GPRS (General Packet Radio Service) network. In another embodiment, the network 610 may be any appropriate cellular data network or cell-based radio network technology. In another embodiment, the network 610 may be an IEEE 802.11B wireless network. In still another embodiment, the network 610 may be any suitable network or combination of networks. Although one network 610 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A computer implemented method of operating a training mode for a filter in a storage system, the method comprising:
receiving from a user during the training mode, a selection of a data file for filing in the storage system, the selected data file without a destination storage location in the storage system previously established by the user;
determining during the training mode, a recommended destination storage location in the storage system for the selected data file using the filter, wherein the filter models relationships between characteristics of the selected data file and storage locations in the storage system;
presenting to the user during the training mode a graphical representation of a hierarchy of storage locations in the storage system that includes a graphical representation of the recommended destination storage location;
receiving user feedback indicating whether the recommended destination storage location is correct or incorrect; and
automatically updating the filter responsive to the user feedback with respect to characteristics of the selected data file and the recommended destination storage location.

2. The method of claim 1, wherein determining a recommended destination storage location for the selected data file is based at least in part on a frequency of use of a destination storage location in the storage system.

3. The method of claim 1, wherein determining a recommended destination storage location for the selected data file is based at least in part on most recent use of a destination storage location in the storage system.

4. The method of claim 1, wherein determining a recommended destination storage location for the selected data file is based at least in part on a frequency of use of a destination storage location and on a most recent use of the recommended destination storage location.

5. The method of claim 1, wherein determining a recommended destination storage location for the selected data file is based at least in part on a metadata file associated with the selected data file that indicates a project associated with the selected data file.

6. The method of claim 1, wherein determining a recommended destination storage location for the selected data file is based at least in part on a metadata file associated with the selected data file that indicates a file type of the selected data file.

7. The method of claim 1, wherein determining a destination storage location for the selected data file is based at least in part on content contained within the selected data file.

8. The method of claim 1, further comprising:
determining a success rate of destination storage location determinations during the training mode; and
switching from the training mode to an automatic mode of applying the filter to the selected data file in response to the success rate reaching a success criteria.

9. The method of claim 8, wherein switching from the training mode to an automatic mode of applying the filter comprises:
switching automatically from the training mode to the automatic mode.

10. The method of claim 8, wherein determining the success rate further comprises:
determining a ratio of correct determinations of the recommended destination storage locations to a total number of determinations, wherein a determination is correct if the selected data file was approved by the user for filing in the recommended destination storage location determined by the filter.

11. The method of claim 1, wherein automatically updating the filter comprises filing the data file in the recommended destination storage location responsive to the user feedback indicating that the recommended destination storage location is correct.

12. The method of claim 11, further comprising moving the selected data file from the recommended destination storage location back to an origin responsive to receiving an undo request.

13. The method of claim 1, wherein automatically updating the filter comprises not filing the selected data file in the recommended destination storage location responsive to the user feedback indicating that the recommended destination storage location is not correct.

14. The method of claim 1 further comprising:
storing the selected data file in the recommended destination storage location responsive to a user command.

15. The method of claim 14, wherein the user command comprises a drag and drop operation of a graphical representation of the selected data file to the graphical representation of the recommended destination storage location.

16. The method of claim 15, further comprising:
filing the selected data file in the recommended destination storage location responsive to a drag and drop operation of the graphical representation of the selected data file across a boundary threshold.

17. The method of claim 1, wherein the hierarchy of storage locations in the storage system is a hierarchical list of folders.

18. The method of claim 1, wherein the hierarchy of storage locations in the storage system is a hierarchical list of directory names.

19. The method of claim 1, further comprising providing an option in the storage system that allows the user to reset the filter.

20. The method of claim 1, further comprising:
operating the storage system in an automatic mode, comprising:
receiving a data file in the automatic mode;
determining a destination storage location for the data file using the filter in the automatic mode; and
automatically filing the data file in the destination storage location responsive to determining the destination storage location.

21. The method of claim 20, wherein automatically filing the data file in the destination storage location occurs after a specified period of time has elapsed since the user finished accessing the data file.

22. The method of claim 20, further comprising:
providing to the user access to the data file;
receiving an indication that the user is finished accessing the data file; and
automatically filing the data file in the destination storage location responsive to receiving the indication.

23. The method of claim 1, further comprising associating metadata with the selected data file based at least in part on previous associations with similar data file.

24. The method of claim 1, wherein the graphical representation of the recommended destination storage location comprises a visual indication that indicates the recommended destination storage location.

25. A computer-implemented method of operating a storage system, the method comprising:
operating the storage system in a training mode for a filter in the storage system comprising:
receiving from a user a selection of a data file for filing in the storage system, the selected data file without a destination storage location in the storage system previously established by the user;
determining a recommended destination storage location in the storage system for the selected data file using the filter, wherein the filter models relationships between characteristics of the selected data file and storage locations in the storage system;
presenting to the user a graphical representation of a hierarchy of storage locations in the storage system that includes a graphical representation of the recommended destination storage location;
receiving user feedback indicating whether the recommended destination storage location is correct or incorrect;
automatically updating the filter responsive to the user feedback with respect to characteristics of the selected data file and the recommended destination storage location; and
switching from the training mode to an automatic mode in response to a success rate reaching a success criteria;
operating the storage system in the automatic mode comprising:
receiving a data file;
determining a destination storage location for the data file using the filter; and
automatically filing the data file in the destination storage location responsive to determining the destination storage location.

26. The method of claim 25, wherein determining a recommended destination storage location for the selected data file is based at least in part on a frequency of use of a destination storage location in the storage system.

27. The method of claim 25, wherein determining a recommended destination storage location for the selected data file is based at least in part on most recent use of a destination storage location in the storage system.

28. The method of claim 25, wherein determining a recommended destination storage location for the selected data file is based at least in part on a frequency of use of a destination storage location and on a most recent use of the recommended destination storage location.

29. The method of claim 25, wherein determining a recommended destination storage location for the selected data file is based at least in part on a metadata file associated with the selected data file that indicates a project associated with the selected data file.

30. The method of claim 25, wherein determining a recommended destination storage location for the selected data file is based at least in part on a metadata file associated with the selected data file that indicates a file type of the selected data file.

31. The method of claim 25, wherein determining a destination storage location for the selected data file is based at least in part on content contained within the selected data file.

32. The method of claim 25, further comprising:
determining a success rate of destination storage location determinations during the training mode.

33. The method of claim 25, wherein switching from the training mode to an automatic mode of applying the filter comprises:
switching automatically from the training mode to the automatic mode.

34. The method of claim 32, wherein determining the success rate further comprises:
determining a ratio of correct determinations of the recommended destination storage locations to a total number of determinations, wherein a determination is correct if the selected data file was approved by the user for filing in the recommended destination storage location determined by the filter.

35. The method of claim 25, wherein automatically updating the filter comprises filing the selected data file in the recommended destination storage location responsive to the user feedback indicating that the recommended destination storage location is correct.

36. The method of claim 25, further comprising moving the selected data file from the recommended destination storage location back to an origin responsive to receiving an undo request.

37. The method of claim 25, wherein automatically updating the filter comprises not filing the selected data file in the recommended destination storage location responsive to the user feedback indicating that the recommended destination storage location is not correct.

38. The method of claim 25 further comprising:
storing the selected data file in the recommended destination storage location responsive to a user command.

39. The method of claim 38 wherein the user command comprises a drag and drop operation of a graphical representation of the selected data file to the graphical representation of the recommended destination storage location.

40. The method of claim 39, further comprising:
  filing the selected data file in the recommended destination storage location responsive to a drag and drop operation of the graphical representation of the selected data file across a boundary threshold.

41. The method of claim 25, wherein the hierarchy of storage locations in the storage system is a hierarchical list of folders.

42. The method of claim 25, wherein the hierarchy of storage locations in the storage system is a hierarchical list of directory names.

43. The method of claim 25, further comprising providing an option in the storage system that allows the user to reset the filter.

44. The method of claim 25, wherein automatically filing the data file in the destination storage location occurs after a specified period of time has elapsed since the user finished accessing the selected data file.

45. The method of claim 25, further comprising:
  providing to the user access to the data file;
  receiving an indication that the user is finished accessing the data file; and
  automatically filing the data file in the destination storage location responsive to receiving the indication.

46. The method of claim 25, further comprising associating metadata with the data file based at least in part on previous associations with a similar data file.

47. The method of claim 25, wherein the graphical representation of the recommended destination storage location comprises a visual indication that indicates the recommended destination storage location.

48. A computer program product having a non-transitory computer-readable storage medium storing computer executable-instructions for operating a training mode for a filter in a storage system, the instructions when executed by a processor perform the operations of: receiving from a user during the training mode, a selection of a data file for filing in the storage system, the selected data file without a destination storage location in the storage system previously established by the user; determining during the training mode, a recommended destination storage location in the storage system for the selected data file using the filter, wherein the filter models relationships between characteristics of the selected data file and storage locations in the storage system; presenting to the user during the training mode a graphical representation of a hierarchy of storage locations in the storage system that includes a graphical representation of the recommended destination storage location; receiving user feedback whether the recommended destination storage location is correct or incorrect; and automatically updating the filter responsive to the user feedback with respect to characteristics of the selected data file and the recommended destination storage location.

49. The computer program product of claim 48, wherein determining a recommended destination storage location for the selected data file is based at least in part on a frequency of use of a destination storage location in the storage system.

50. The computer program product of claim 48, wherein determining a recommended destination storage location for the selected data file is based at least in part on most recent use of a destination storage location in the storage system.

51. The computer program product of claim 48, wherein determining a recommended destination storage location for the selected data file is based at least in part on a frequency of use of a destination storage location and on a most recent use of the recommended destination storage location.

52. The computer program product of claim 48, wherein determining a recommended destination storage location for the selected data file is based at least in part on a metadata file associated with the selected data file that indicates a project associated with the selected data file.

53. The computer program product of claim 48, wherein determining a recommended destination storage location for the selected data file is based at least in part on a metadata file associated with the selected data file that indicates a file type of the selected data file.

54. The computer program product of claim 48, wherein determining a destination storage location for the selected data file is based at least in part on content contained within the selected data file.

55. The computer program product of claim 48, further comprising instructions for:
  determining a success rate of destination storage location determinations during the training mode; and
  switching from the training mode to an automatic mode of applying the filter to the selected data file in response to the success rate reaching a success criteria.

56. The computer program product of claim 55, wherein switching from the training mode to an automatic mode of applying the filter comprises:
  switching automatically from the training mode to the automatic mode.

57. The computer program product of claim 55, wherein determining the success rate further comprises:
  determining a ratio of correct determinations of the recommended destination storage locations to a total number of determinations, wherein a determination is correct if the selected data file was approved by the user for filing in the recommended destination storage location determined by the filter.

58. The computer program product of claim 48, wherein automatically updating the filter comprises filing the data file in the recommended destination storage location responsive to the user feedback indicating that the recommended destination storage location is correct.

59. The computer program product of claim 58, further comprising moving the data file from the recommended destination storage location back to an origin responsive to receiving an undo request.

60. The computer program product of claim 48, wherein automatically updating the filter comprises not filing the data file in the recommended destination storage location responsive to the user feedback indicating that the recommended destination storage location is not correct.

61. The computer program product of claim 48, further comprising:
  storing the selected data file in the recommended destination storage location responsive to a user command.

62. The computer program product of claim 48, wherein the user command comprises a drag and drop operation of a graphical representation of the selected data file to the graphical representation of the recommended destination storage location.

63. The computer program product of claim 62, further comprising:
  filing the selected data file in the recommended destination storage location responsive to a drag and drop operation of the graphical representation of the selected data file across a boundary threshold.

64. The computer program product of claim 48, wherein the hierarchy of storage locations in the storage system is a hierarchical list of folders.

65. The computer program product of claim 48, wherein the hierarchy of storage locations in the storage system is a hierarchical list of directory names.

66. The computer program product of claim 48, further comprising providing an option in the storage system that allows the user to reset the filter.

67. The computer program product of claim 48, further comprising:
operating the storage system in an automatic mode, comprising:
receiving a data file in the automatic mode;
determining a destination storage location for the data file using the filter in the automatic mode; and
automatically filing the data file in the destination storage location responsive to determining the destination storage location.

68. The computer program product of claim 67, wherein automatically filing the data file in the destination storage location occurs after a specified period of time has elapsed since the user finished accessing the data file.

69. The computer program product of claim 67, further comprising:
providing access to the data file to the user;
receiving an indication that the user is finished accessing the data file; and
automatically filing the data file in the destination storage location responsive to receiving the indication.

70. The computer program product of claim 48, further comprising associating metadata with the selected data file based at least in part on previous associations with similar data file.

71. The computer program product of claim 48, wherein the graphical representation of the recommended destination storage location comprises a visual indication that indicates the recommended destination storage location.

72. A computer program product having a non-transitory computer-readable storage medium storing computer executable-instructions for operating a storage system, the instructions when executed by a processor perform the operations of:
operating the storage system in a training mode comprising: receiving from a user a selection of a data file for filing in the storage system, the selected data file without a destination storage location in the storage system previously established by the user; determining a recommended destination storage location in the storage system for the selected data file using the filter, wherein the filter models relationships between characteristics of the selected data file and storage locations in the storage system; presenting to the user a graphical representation of a hierarchy of storage locations in the storage system that includes a graphical representation of the recommended destination storage location; receiving user feedback indicating whether the recommended destination storage location is correct or incorrect; automatically updating the filter responsive to the user feedback with respect to characteristics of the selected data file and the recommended destination storage location; and switching from the training mode to an automatic mode in response to a success rate reaching a success criteria; operating the storage system in the automatic mode comprising: receiving a data file; determining a destination storage location for the data file using the filter; and automatically filing the data file in the destination storage location responsive to determining the destination storage location.

73. The computer program product of claim 72, wherein determining a recommended destination storage location for the selected data file is based at least in part on a frequency of use of a destination storage location in the storage system.

74. The computer program product of claim 72, wherein determining a recommended destination storage location for the selected data file is based at least in part on most recent use of a destination storage location in the storage system.

75. The computer program product of claim 72, wherein determining a recommended destination storage location for the selected data file is based at least in part on a frequency of use of a destination storage location and on a most recent use of the recommended destination storage location.

76. The computer program product of claim 72, wherein determining a recommended destination storage location for the selected data file is based at least in part on a metadata file associated with the selected data file that indicates a project associated with the selected data file.

77. The computer program product of claim 72, wherein determining a recommended destination storage location for the selected data file is based at least in part on a metadata file associated with the selected data file that indicates a file type of the selected data file.

78. The computer program product of claim 72, wherein determining a destination storage location for the selected data file is based at least in part on content contained within the selected data file.

79. The computer program product of claim 72, further comprising:
determining a success rate of destination storage location determinations during the training mode.

80. The computer program product of claim 72, wherein switching from the training mode to an automatic mode of applying the filter comprises:
switching automatically from the training mode to the automatic mode.

81. The computer program product of claim 79, wherein determining the success rate further comprises:
determining a ratio of correct determinations of the recommended destination storage locations to a total number of determinations, wherein a determination is correct if the selected data file was approved by the user for filing in the recommended destination storage location determined by the filter.

82. The computer program product of claim 72, wherein automatically updating the filter comprises filing the data file in the recommended destination storage location responsive to the user feedback indicating that the recommended destination storage location is correct.

83. The computer program product of claim 72, further comprising moving the selected data file from the recommended destination storage location back to an origin responsive to receiving an undo request.

84. The computer program product of claim 72, wherein automatically updating the filter comprises not filing the selected data file in the recommended destination storage location responsive to the user feedback indicating that the recommended destination storage location is not correct.

85. The computer program product of claim 72, further comprising:
storing the selected data file in the recommended destination storage location responsive to a user command.

86. The computer program product of claim 85, wherein the user command comprises a drag and drop operation of a graphical representation of the selected data file to the graphical representation of the recommended destination storage location.

87. The computer program product of claim 86, further comprising:
filing the selected data file in the recommended destination storage location responsive to a drag and drop operation of the graphical representation of the selected data file across a boundary threshold.

88. The computer program product of claim 72, wherein the hierarchy of storage locations in the storage system is a hierarchical list of folders.

89. The computer program product of claim 72, wherein the hierarchy of storage locations in the storage system is a hierarchical list of directory names.

90. The computer program product of claim 72, further comprising providing an option in the storage system that allows the user to reset the filter.

91. The computer program product of claim 72, wherein automatically filing the data file in the destination storage location occurs after a specified period of time has elapsed since the user finished accessing the data file.

92. The computer program product of claim 72, further comprising:
   providing access to the data file to the user;
   receiving an indication that the user is finished accessing the data file; and
   automatically filing the data file in the destination storage location responsive to receiving the indication.

93. The computer program product of claim 72, further comprising associating metadata with the data file based at least in part on previous associations with similar data file.

94. The computer program product of claim 72, wherein the graphical representation of the recommended destination storage location comprises a visual indication that indicates the recommended destination storage location.

95. A storage system, comprising:
   a computer processor; and
   a non-transitory computer-readable storage medium storing computer executable-instructions that when executed by the computer processor causes the storage system to operate in modes comprising:
   a training mode in which the storage system applies a filter to a data file for determining a recommended destination storage location in the storage system for the data file using the filter, wherein the filter models relationships between characteristics of the data file and storage locations in the storage system and presents to the user a graphical representation of a hierarchy of storage locations in the storage system that includes a graphical representation of the recommended destination storage location and in which the storage system automatically updates the filter responsive to user feedback that indicates whether the recommended destination storage location is correct or incorrect, wherein the filter is updated with respect to characteristics of the selected data file and the recommended destination storage location;
   an automatic mode in which the storage system applies the trained filter to a data file for determining a destination storage location for the data file and automatically filing the data file in the destination storage location;
   wherein the storage system switches from the training mode to the automatic mode in response to a success rate of destination storage location determinations in the training mode reaching a success criteria.

96. The storage system of claim 95, wherein determining a recommended destination storage location for the data file is based at least in part on a frequency of use of a destination storage location in the storage system.

97. The storage system of claim 95, wherein determining a recommended destination storage location for the data file is based at least in part on most recent use of a destination storage location in the storage system.

98. The storage system of claim 95, wherein determining a recommended destination storage location for the data file is based at least in part on a frequency of use of a destination storage location and on a most recent use of the recommended destination storage location.

99. The storage system of claim 95, wherein determining a recommended destination storage location for the data file is based at least in part on a metadata file associated with the selected data file that indicates a project associated with the selected data file.

100. The storage system of claim 95, wherein determining a recommended destination storage location for the data file is based at least in part on a metadata file associated with the selected data file that indicates a file type of the selected data file.

101. The storage system of claim 95, wherein determining a destination storage location for the data file is based at least in part on content contained within the selected data file.

102. The storage system of claim 95, wherein the training mode further determines a success rate of destination storage location determinations during the training mode and switches from the training mode to an automatic mode of applying the filter to the selected data file in response to the success rate reaching a success criteria.

103. The storage system of claim 95, wherein the storage system switches from the training mode to an automatic mode further comprises:
   switching automatically from the training mode to the automatic mode.

104. The storage system of claim 102, wherein the training mode further determines a success rate further comprises:
   determining a ratio of correct determinations of the recommended destination storage locations to a total number of determinations, wherein a determination is correct if the selected data file was approved by the user for filing in the recommended destination storage location determined by the filter.

105. The storage system of claim 95, wherein the storage system automatically updates the filter comprises filing the data file in the recommended destination storage location responsive to the user feedback indicating that the recommended destination storage location is correct.

106. The storage system of claim 105, wherein the storage system moves the data file from the recommended destination storage location back to an origin responsive to receiving an undo request.

107. The storage system of claim 95, wherein the storage system automatically updates the filter comprises not filing the data file in the recommended destination storage location responsive to the user feedback indicating that the recommended destination storage location is not correct.

108. The storage system of claim 95, wherein the storage system stores the data file in the recommended destination storage location responsive to a user command.

109. The storage system of claim 108, wherein the user command comprises a drag and drop operation of a graphical representation of the selected data file to the graphical representation of the recommended destination storage location.

110. The storage system of claim 109, wherein the storage system files the data file in the recommended destination storage location responsive to a drag and drop operation of the graphical representation of the selected data file across a boundary threshold.

111. The storage system of claim 95, wherein the hierarchy of storage locations in the storage system is a hierarchical list of folders.

112. The storage system of claim 95, wherein the hierarchy of storage locations in the storage system is a hierarchical list of directory names.

113. The storage system of claim 95, wherein the storage system further provides an option in the data file storage system that allows the user to reset the filter.

114. The storage system of claim 95, wherein automatically filing the data file in the destination storage location occurs after a specified period of time has elapsed since the user finished accessing the data file.

115. The storage system of claim 95, wherein the storage system further:

provides access to the data file to the user;

receives an indication that the user is finished accessing the data file; and automatically files the data file in the destination storage location responsive to receiving the indication.

116. The storage system of claim 95, wherein the storage system further associates metadata with the data file based at least in part on previous associations with similar data file.

117. The storage system of claim 95, wherein the graphical representation of the recommended destination storage location comprises a visual indication that indicates the recommended destination storage location.

\* \* \* \* \*

UNITED STATES PATENT AND TRADEMARK OFFICE
CERTIFICATE OF CORRECTION

| | | |
|---|---|---|
| PATENT NO. | : 7,849,141 B1 | Page 1 of 1 |
| APPLICATION NO. | : 10/836472 | |
| DATED | : December 7, 2010 | |
| INVENTOR(S) | : Jerome R. Bellegarda et al. | |

It is certified that error appears in the above-identified patent and that said Letters Patent is hereby corrected as shown below:

On page 2, in column 1, under "Other Publications", line 15, delete "Artificia" and insert -- Artificial --, therefor.

In column 5, line 21, delete "symantic" and insert -- semantic --, therefor.

In column 5, line 37, delete "off" and insert -- off. --, therefor.

Signed and Sealed this
Twenty-fifth Day of October, 2011

David J. Kappos
*Director of the United States Patent and Trademark Office*